United States Patent Office 3,371,920
Patented Mar. 5, 1968

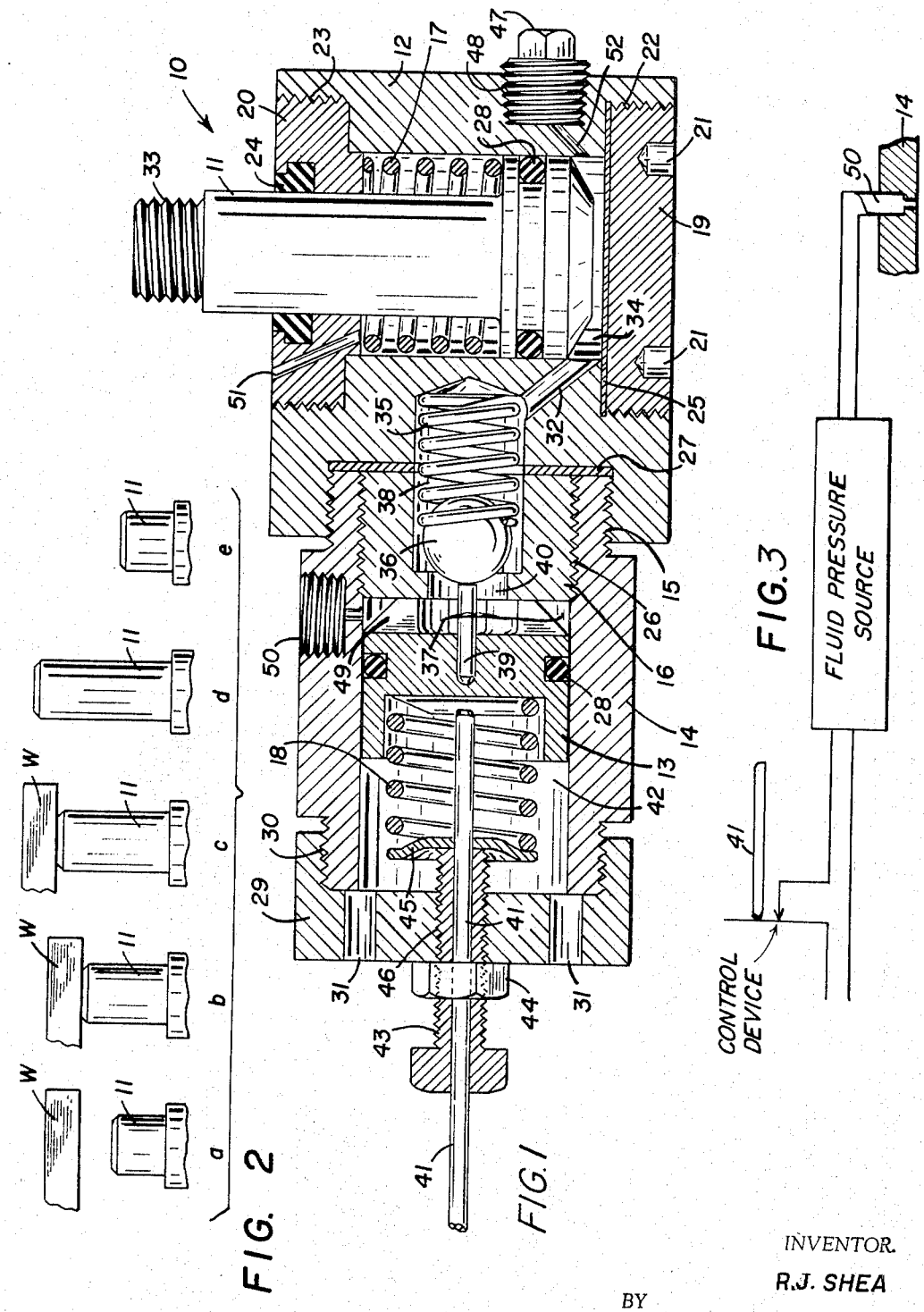

3,371,920
WORKPIECE ENGAGING AND
SUPPORTING DEVICE
Richard J. Shea, Spring Valley, Calif., assignor to Rohr Corporation, Chula Vista, Calif., a corporation of California
Filed June 10, 1965, Ser. No. 462,830
1 Claim. (Cl. 269—23)

ABSTRACT OF THE DISCLOSURE

A workpiece support responds to hydraulic pressure sufficient to cause the same to move and engage the workpiece but insufficient to lift it. Once engaged, the hydraulic pressure is permitted to build up in accordance with a predetermined loading of the workpiece on the support. This pressure buildup closes a valve for preventing release of the hydraulic fluid which then becomes the means of support for the workpiece. If the workpiece is displaced away from a previous position, the hydraulic fluid displaces the workpiece support correspondingly to provide continuous engagement with the workpiece. When the workpiece is removed, the valve is released draining the entrapped fluid and permitting removal of the support device from the workpiece.

---

This invention relates to workpiece supports in general and more particularly to a workpiece support which senses the location of the workpiece and responds to an internal fluid pressure sufficient to engage and support the workpiece without lifting it. Once engaged this workpiece support will continue to withstand an increasing or decreasing force without yielding and will respond to any movement of the workpiece away from the support.

In modern large scale machining and fabrication operations a variety of mechanical wedges, spring jacks, hydraulic clamps, adjusting screws and other similar supports have been found necessary in order to provide adequate support for the parts being machined and formed. Accordingly the use of these various prior art support devices have required constant manual adjustment by the machine operator prior to and after each machining cut. Difficulty has also been experienced using these prior art devices in getting the part to properly seat up against the wedges and clamps due to the inclusion of machine chips and variations in operator technique. In many of the automatic machining and numerically controlled operations a great deal of time and effort is expended in constantly adjusting and re-adjusting the workpiece support devices for these same previously mentioned reasons.

In order to overcome and eliminate these time consuming adjustment operations the present invention provides a means whereby all of these adjustment operations are automatically performed while still providing the necessary support for the workpiece.

To accomplish this desirable result, the workpiece support is made to respond to a hydraulic pressure sufficient to engage the workpiece but insufficient to lift it. Once engaged the hydraulic pressure build up will close a valve which will prevent the release of the hydraulic fluid as long as the workpiece is resting on the support, the trapped hydraulic fluid being the means of support for the workpiece. Additional force exerted by the workpiece only serves to force the valve to seal even tighter. In the event that the workpiece is displaced away from a previous position, the pressurized hydraulic fluid will displace the workpiece support a corresponding distance so as to provide continuous engagement with the workpiece. When the workpiece stops exerting force against the support and is removed, the valve is released by spring action which drains the entrapped fluid and permits removal of the support device from the workpiece.

The objects of the invention

An object of the present invention, therefore, is to provide a means for automatically supporting a workpiece without requiring any manual adjustments.

Another object is to provide a means for supporting a workpiece which senses the workpiece location and automatically locks in this position.

Another object is to provide a means for supporting a workpiece which provides an unyielding abutment in reaction to an increase in the force exerted by the workpiece.

Still another object is to provide a means for supporting a workpiece which will remain engaged with the workpiece, while still providing support, in the event the workpiece is displaced away from a previous location.

The drawings

Still other objects, features and advantages of the present invention will become more clearly apparent as the description proceeds, reference being had to the accompanying drawings wherein:

FIG. 1 is a sectional view of the workpiece support device; and

FIG. 2a–e is a schematic showing of the operating positions of the support device.

FIG. 3 is a schematic diagram of the fluid pressure source actuated by a control device, in turn, actuated by a probe of the support device.

The specification

Describing the invention in detail, attention is directed to FIG. 1 wherein the referenced numeral 10 designates the support device.

The support device 10 is comprised mainly of a spring loaded work support piston 11 which is slidably mounted in the main body housing 12 and a second spring loaded piston designated as the ball check actuator piston 13 which is slidably mounted in the ball check actuator housing 14. The actuator housing 14 is attached to the main body housing 12 by means of the threads 15. A ball check valve 16 located within the actuator housing 14 allows hydraulic fluid to enter the main body housing 12. This ball check valve 16 is attached to the housing 14 by means of threads 26. A work support piston spring 17 located in the main body housing 12 allows for the draining of the system by forcing down the work support piston 11. A bleed valve 47, to facilitate bleeding air from the device is attached to the housing 12 by means of threads 48. This bleeding is accomplished through the air passage 52 in the wall of housing 12. A ball check actuator spring 18 located within the actuator housing 14 serves to exert force on the actuator piston 13 which in turn allows the check valve 16 to remain open for the passage of hydraulic fluid.

The main body housing 12 is enclosed by the main housing plug 19 and a bushing end cap 20. Grip holes 21 are provided in the plug 19 to aid in inserting the plug 19 into the housing 12 by means of the threads 22. The end cap 20 is inserted into the housing by means of the threads 23. A rod wiper 24 is inserted in the end cap 20 for removal of lubricating fluid from the piston 11. A vent 51 for the housing 12 is provided in the end cap 20.

A load bearing metallic gasket 25 serves as a seal between the housing 12 and the plug 19 while a similar load bearing metallic gasket 27 serves as a seal between the housing 12, the check valve 16 and the actuator housing 14. O-ring seals 28 are provided for both the piston 11 and the piston 13.

The actuator housing 14 is enclosed by a closure 29 which is fastened to the housing 14 by means of the threads 30. Vents 31 for the housing 14 are provided in the closure 29.

In operating the support device, hydraulic fluid under pressure is admitted through a common inlet and exhaust port 50 in housing 14, thence through the ports in piston 13 provided by the fluted end portion 49 thereof which in the position of the parts, as shown, abuts the check valve 16. The fluted end portion extends around the periphery of the piston end face only, thus leaving a central voided region opposite the ball check port 40. This central voided region and the fluted regions or channels constitute the chamber 37 of the actuator housing 14 which now becomes filled with the fluid. The hydraulic fluid under pressure is then directed through the valve opening 40 and the check valve 16 into the valve chamber 38 and then into chamber 34 of the main body housing 12 through the port 32. The admission of the hydraulic fluid under pressure into chamber 34 displaces the piston 11 upward until it contacts a workpiece, not shown. Threads 33 are provided at the end of the piston 11 in order to have a variety of tool attachments fastened for various support requirements.

The particular hydraulic pressure used is of such a magnitude that it can overcome ther esistance of the check valve spring 35 and the resistance of the work support piston spring 17 which act to keep the check valve 16 closed and the piston 11 at the bottom of the housing 12 and provide the piston 11 with a specific end thrust. The hydraulic pressure selected however, is in the absence of the build up pressure subsequently to be described, is not sufficient to overcome the resistance of the actuator piston spring 18 and displace the actuator piston 13 to the left, as viewed in the drawing. Once any additional resistance is encountered which overcomes the end thrust of the piston 11 as where the piston 11 engages the workpiece, the hydraulic pressure is no longer sufficient to further displace the piston 11 and the piston 11 will just contact the workpiece and not lift or move it from its present location. In the event the workpiece moves away from the piston 11 the additional resistance is removed and the piston 11 will continue to be displaced until it once again engages the workpiece. Because of this unique feature of the invention it is possible for support to be automatically provided for a workpiece even though the workpiece might be displaced away from the support piston 11 subsequent to a particular machining or fabrication operation.

Once the piston 11 contacts the workpiece the fluid pressure will begin to build up within the chamber 34. The initial hydraulic pressure was sufficient to overcome the resistance of the ball check spring 35 and displace the ball check 36 towards the right, as viewed in the drawing, and thus allow passage of the hydraulic fluid through the valve opening 40 and the valve port 32 and into the chamber 34. With the increased pressure buildup in the chamber 34 transmitted back to the common chamber 38 of the check valve 16 and the housing 12, the incoming pressure of the fluid in the chamber 37 of the actuator housing 14 is no longer able to overcome both the resistance of the spring 35 and the increased pressure buildup. The spring 35 therefore, with the aid of the increased pressure buildup in the chamber 38 forces the ball check 36 to seat and closes the valve opening 40. Any additional loading on the piston 11, such as where the workpiece attempts to move against the piston 11, will only further increase the fluid pressure buildup in chambers 34 and 38 and just serve to force the ball check 26 to seal even tighter. The actual trapped hydraulic fluid now serves as the means for supporting the workpiece.

In order to come as close as possible to a truly unyielding assembly and provide for an absolute minimum of movement of the piston 11 the compressibility of both the hydraulic fluid itself and the gasket seals had to be considered. To minimize the effect of the compressibility of the hydraulic fluid the chambers 34 and 38 have been so constructed that they function with only a nominal volume of hydraulic fluid. The gasket seals 25 and 27 are fabricated of a metallic material, such as copper, to further minimize any yielding. The total effect of both the unique chamber design and the use of metallic gaskets results in a work support device which will deflect or be displaced a maximum of only 0.005 inch.

Initially when the hydraulic fluid is first admitted through the inlet port 50 the fluid pressure on piston 13 is not sufficient to overcome the resistance of the actuator piston spring 18 and displace the actuator piston 13 to the left. Hence the hydraulic fluid initially is directed through the valve opening 40 as aforedescribed. Now, however, there is a sufficient buildup of pressure in the chamber 38 such that spring 35 closes ball check 36. The ball check in turn, engages and displaces a projection member 39 secured to piston 13. The combined force of spring 35 and the pressure on piston 13 is sufficient to overcome the resistance of the spring 18 and, hence, the actuator piston 13 is displaced to the left.

When the ball check 36 seats, the piston 13 is displaced to a point where it comes in contact with a probe 41 which is inserted into the chamber 42 through a hollowed out portion of the adjusting screw 43. The adjusting screw 43 is inserted into the closure 29 and the housing 14 by means of threads 46 and secured to adjusted position by the lock nut 44. Probe 41 is thus moved to actuate a microswitch, not shown, which may be connected to cut off the supply of the pressurized hydraulic fluid which is no longer needed to displace the support piston 11. Alternatively, the microswitch may be connected to a signalling device to alert the machine operator who can then manually shut off the supply of pressurized fluid. At this point the workpiece may be removed or clamped down if this is found to be necessary or desirable.

When the load is removed from the piston 11 such as when the machining or fabrication operation is completed and the workpiece is removed from the machine, the actuator spring 18 will displace the piston 13 to the right, thereby opening the check valve 16 and permitting the work piston spring 17 to force the piston 11 down to drain the hydraulic fluid from the chambers 34 and 38.

Spring 18 is seated on a washer 45, which in turn is, seated on adjusting screw 43. Taking up on the adjusting screw 43 and increasing the resistance of the actuator spring 18 makes it possible to vary the loading on the work support piston 11 necessary to close the check valve 16.

By way of summary the various operating positions which may be assumed by the work piston 11 in relation to or upon the removal of a workpiece W are depicted in FIG. 2a–e.

In FIG. 2a the piston is shown in its pre-actuated position preparatory to movement toward and engagement with the workpiece, as shown in FIG. 2b.

FIG. 2c illustrates the follow-up and continuous engagement of the piston with a workpiece which has been displaced somewhat from its original position. In this instance neither the operation nor the microswitch must have cut off the supply of pressurized fluid. When the workpiece has been displaced beyond the limit of travel of the piston, the piston will extend to its limiting position as shown in FIG. 2d.

When the supply of pressurized fluid has been cut off and the workpiece is removed, the piston will return to its original position as shown in FIG. 2e.

From the foregoing it will now be apparent that a novel and unique workpiece support device has been provided which is well adapted to fulfill the aforestated objects of the invention. While various alternative embodiments which fall within the scope of the present invention may suggest themselves to those skilled in the art, it is intended in the appended claim to cover all such additional embodiments, constructions and variations which fall within the spirit and scope of the invention.

Having thus described the invention, what is claimed as new and useful and what is desired to be secured by Letters Patent is:

1. A fluid pressure responsive device for automatically engaging and supporting a workpiece without lifting the same comprising, in combination, a first piston, a casing having a port for receiving fluid under pressure and slidably supporting said piston for extensive movement outwardly of the casing into engagement with the workpiece in response to pressure of said fluid on the piston, a coil spring for urging the piston inwardly of the casing, a ball check valve interposed between the piston and said port for providing fluid flow therebetween when the ball of the check valve is unseated, a coil spring for urging the ball into its seated position, a member adjustably secured to the casing and movable toward said ball check, a second piston having said fluid pressure applied thereto from said port and interposed slidably within said casing between said ball check and said adjustable member and having a projection in abutting engagement with said ball, a coil spring interposed between said adjustable member and said second piston for spring loading the same to unseat the ball with a predetermined spring force in accordance with the setting of the adjustable member and a predetermined loading of the workpiece on said first piston by the build up of said pressure thereon following said engagement of the first piston with the workpiece, and a probe engageable and movable by the second piston as the ball seats in response to said build up of pressure for actuating a control device to cut off said fluid pressure from said port.

References Cited
UNITED STATES PATENTS

| | | | |
|---|---|---|---|
| 2,337,573 | 12/1943 | Schultz | 269—26 X |
| 2,892,313 | 6/1959 | Hansberg | 269—25 X |
| 2,918,908 | 12/1959 | Herner | 200—82 X |
| 3,074,384 | 1/1963 | Pilch. | |

ROBERT C. RIORDON, *Primary Examiner.*

J. F. McKEOWN, *Assistant Examiner.*